United States Patent
Littrel

(10) Patent No.: US 10,005,003 B1
(45) Date of Patent: Jun. 26, 2018

(54) SYSTEMS AND METHODS FOR CLEANING A RECTIFICATION COLUMN

(71) Applicant: Norland International, Inc., Lincoln, NE (US)

(72) Inventor: Tanner Ryan Littrel, Ceresco, NE (US)

(73) Assignee: Norland International, Inc., Lincoln, NE (US)

( * ) Notice: Subject to any disclaimer, the term of this patent is extended or adjusted under 35 U.S.C. 154(b) by 0 days. days.

(21) Appl. No.: 15/686,000

(22) Filed: Aug. 24, 2017

(51) Int. Cl.
*B01D 3/16* (2006.01)
*B01D 3/02* (2006.01)
*B01D 3/00* (2006.01)

(52) U.S. Cl.
CPC ............ *B01D 3/163* (2013.01); *B01D 3/001* (2013.01); *B01D 3/02* (2013.01)

(58) Field of Classification Search
CPC .............................................. B01D 3/14–3/328
See application file for complete search history.

(56) References Cited

U.S. PATENT DOCUMENTS

| | | | | |
|---|---|---|---|---|
| 2,602,652 A * | 7/1952 | Haynes | ............ | B01D 3/205 261/114.2 |
| 3,162,701 A * | 12/1964 | Joor, II | ............ | B01D 3/163 261/114.1 |
| 3,959,419 A * | 5/1976 | Kitterman | ............ | B01D 47/14 261/112.1 |
| 4,264,538 A * | 4/1981 | Moore | ............ | B01D 3/18 239/193 |
| 5,164,125 A * | 11/1992 | Binkley | ............ | B01D 3/20 261/114.1 |
| 5,192,466 A * | 3/1993 | Binkley | ............ | B01D 3/20 261/114.1 |
| 5,512,140 A * | 4/1996 | Rutan | ............ | B01D 3/163 122/390 |
| 6,739,585 B1 * | 5/2004 | Urbanski | ............ | B01D 3/008 261/114.1 |
| 8,974,640 B2 * | 3/2015 | Tamminen | ............ | B01D 3/008 196/100 |
| 9,072,986 B2 * | 7/2015 | Kim | ............ | B01D 3/326 |
| 2008/0277260 A1 * | 11/2008 | Binkley | ............ | B01D 3/163 202/160 |
| 2011/0308932 A1 * | 12/2011 | Tamminen | ............ | B01D 3/008 203/91 |
| 2013/0312608 A1 * | 11/2013 | Zaman | ............ | B01D 3/008 95/211 |

* cited by examiner

*Primary Examiner* — Jonathan Miller
(74) *Attorney, Agent, or Firm* — Foley & Lardner LLP

(57) ABSTRACT

A distillation system includes a pot and a rectification column. Vapor is produced in the pot and the rectification column receives the vapor from the pot. The rectification column includes a first plate, a first ring, and a fluid distribution system. The first plate is positioned within the rectification column. The first ring is positioned within the rectification column. The first ring includes a first plurality of apertures. The fluid distribution system receives a pressurized cleaning fluid and provides the pressurized cleaning fluid to the first ring such that the pressurized cleaning fluid is propelled from the first ring via the first plurality of apertures into the rectification column. At least some of the first plurality of apertures are configured to cause the pressurized cleaning fluid propelled therefrom to contact the first plate.

20 Claims, 6 Drawing Sheets

SYSTEMS AND METHODS FOR CLEANING A RECTIFICATION COLUMN

TECHNICAL FIELD

Embodiments of the present disclosure relate to systems and methods for cleaning a rectification column in a distillation system, for example a still used in the production of alcohol.

BACKGROUND

A distillation process occurs by heating a liquid in a still, collecting vapor produced by the heated liquid, and cooling the vapor back into a liquid. When heating an ethyl alcohol and water liquid mixture in the still, the ethyl alcohol vaporizes before the water due to having a lower boiling point than the water. Distillation systems take advantage of this by collecting the ethyl alcohol vapor, separating it from vapor produced by the water and then condensing the ethyl alcohol vapor. In this way, distillation systems are able to extract the ethyl alcohol from a liquid mixture.

Distillation systems typically incorporate rectification columns where the separation of distillate compounds (e.g., alcohol, ethanol, liquid water, etc.) occurs. Within the rectification columns are a number of plates (e.g., bubble plates, etc.) that selectively segment the rectification column into a number of sections between which equilibrium processes occur. Each of the plates may include a valve that may be opened such that the distillate compounds can bypass each plate and therefore each section. The more sections that the distillation compounds are routed through, the higher a final concentration of the alcohol or ethanol in the mixture will be. In this way, an operator can open or close the valves on the rectification column to control the final concentration of the alcohol or ethanol.

Distillation systems are typically constructed from copper components because of the high thermal conductivity of copper. The ethyl alcohol contacts copper surfaces within the distillation systems which can cause a chemical reaction to occur as the sulfides within the vapor react with the copper surfaces. As a result, these sulfides may become trapped within a layer or film of deposits on the copper surfaces. These deposits typically have to be removed between distillation processes (e.g., batches, etc.).

Currently, distillation systems include a clean-in-place (CIP) system that allows an operator to clean the copper surfaces inside the distillation system such that the layer of deposits is removed. These CIP systems are operated through the use of valves and plumping and typically involve injecting a cleaning solution into the distillation systems such that the cleaning solution removes the layer of sulfide deposits. In this way, these CIP systems eliminate the need for the operator to manually scrub and treat the copper surfaces (e.g., using pressurized fluid, etc.).

CIP systems include nozzles, such as CIP balls, through which the cleaning solution is injected. These nozzles disperse the cleaning solution within specific components of the distillation system. For example, when a pressurized supply of cleaning solution is provided to the nozzles, the nozzles may rotate causing the cleaning solution to be sprayed outwards. However, the CIP balls are unable to spray the cleaning solution in a three-hundred and sixty degree trajectory, the structure which supports the CIP balls observes some range of cleaning. As a result, a need exists for a CIP system that provides cleaning solution in a three-hundred and sixty degree trajectory such that still components may be more efficiently and effectively cleaned.

For some relatively smaller components of the distillation system, such as between plates in the rectification column, these nozzles may be ineffective and/or inefficient in removing the deposits due to inconsistent spray of the cleaning solution. Further, these CIP balls are configured such that the cleaning solution is sprayed in a top-down manner which causes the cleaning solution to trickle into a dephlagemator of the distillation system. As a result, a need exists for providing a CIP system that effectively and efficiently cleans deposits from copper surfaces of relatively smaller components of a distillation system, such as between plates in a rectification column.

SUMMARY

One embodiment relates to a distillation system. The distillation system includes a pot and a rectification column. Vapor is produced in the pot and the rectification column receives the vapor from the pot. The rectification column includes a first plate, a first ring, and a fluid distribution system. The first plate is positioned within the rectification column. The first ring is positioned within the rectification column. The first ring includes a first plurality of apertures. The fluid distribution system receives a pressurized cleaning fluid and provides the pressurized cleaning fluid to the first ring such that the pressurized cleaning fluid is propelled from the first ring via the first plurality of apertures into the rectification column. At least some of the first plurality of apertures are configured to cause the pressurized cleaning fluid propelled therefrom to contact the first plate.

Another embodiment relates to a rectification column for a distillation system. The rectification column includes a first column section, a second column section, a first annular support, a first plate, and a first ring. The first annular support is positioned between the first column section and the second column section. The first annular support is coupled to the first column section and the second column section. The first plate is coupled to the first annular support. The first ring includes a first plurality of apertures. The first ring is positioned within one of the first column section and the second column section. The first ring selectively receives fluid and provides the fluid through the first plurality of apertures.

Yet another embodiment relates to a fluid distribution system for a distillation system The fluid distribution system includes a first flange and a first ring. The first flange selectively receives a fluid. The first ring is coupled to the first flange. The first ring is positioned within the distillation system. The first ring includes a first annular body. The first annular body has a circular cross-section and receives the fluid from the first flange. The first plurality of apertures is disposed along the first annular body. Each of the first plurality of apertures is structured to provide the fluid from the first annular body to a first target within the distillation system.

These and other features, together with the organization and manner of operation thereof, may become apparent from the following detailed description when taken in conjunction with the accompanying Figures.

DETAILED DESCRIPTION

Referring to the Figures generally, systems, methods, and apparatuses for cleaning a rectification column in a distillation system are depicted and described herein.

Figure 1:
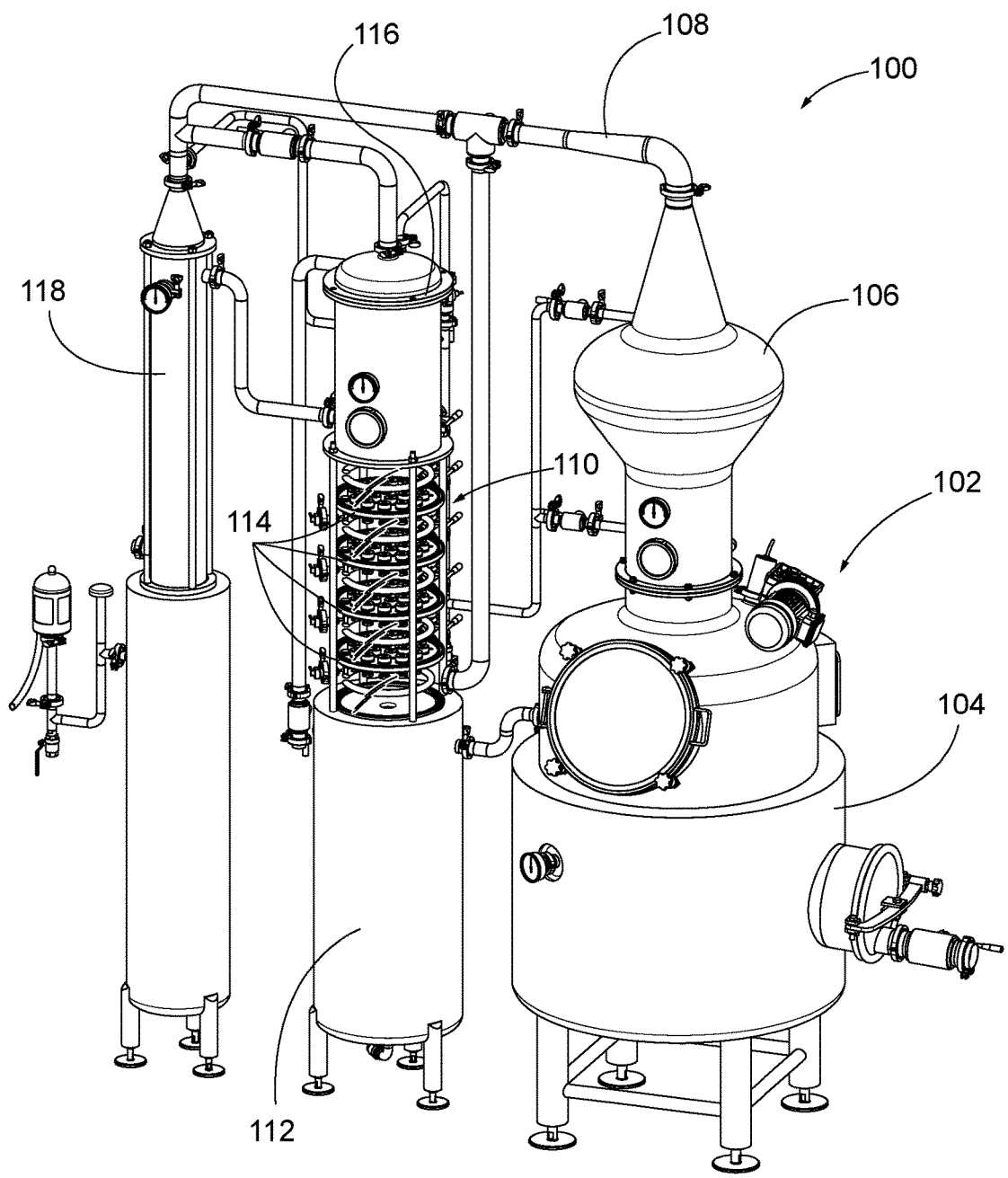
FIG. 1 is a perspective view of a distillation system, according to an exemplary embodiment.

Referring to FIG. 1, a distillation system 100 for distilling ethyl alcohol is shown. The distillation system 100 includes a pot 102 that includes a steam jacket 104. The distillation system 100 also includes a helmet 106. In operation, a liquid mixture of ethyl alcohol and water is introduced into the pot 102. The pot 102 is heated via the steam jacket 104 such that the ethyl alcohol at least partially vaporizes. The vaporized ethyl alcohol collects within the helmet 106 and is guided into a Lyne arm 108. The helmet 106 also guides reflux (i.e., ethyl alcohol condensate and water condensate) back into the pot 102. The Lyne arm 108 directs the vapor into a rectification column 110 and then into a low wines receiver 112 where the vapor is condensed.

Once all of the ethyl alcohol has been evaporated from the pot 102 and collected and condensed in the low wines receiver 112, the low wines receiver 112 is heated, causing vapor to rise into the rectification column 110 and pass through a series of plate assemblies 114. The vapor then collects within a vapor management condenser or dephlagemator 116. Within the dephlagemator 116, reflux is collected and directed back into the rectification column 110, and the vapor is directed into a liquid management condenser 118. The reflux directed back into the rectification column 110 may then be vaporized to rise through the rectification column 110 again. Within the liquid management condenser 118, the vapor is condensed into a product liquid (e.g., spirit, liquor, whiskey, bourbon, gin, vodka, tequila, etc.) and provided to at least one of a condenser stand 120 and a parrot 122. The parrot 122 is utilized by an operator to determine the alcohol content of the product liquid.

Figure 2:
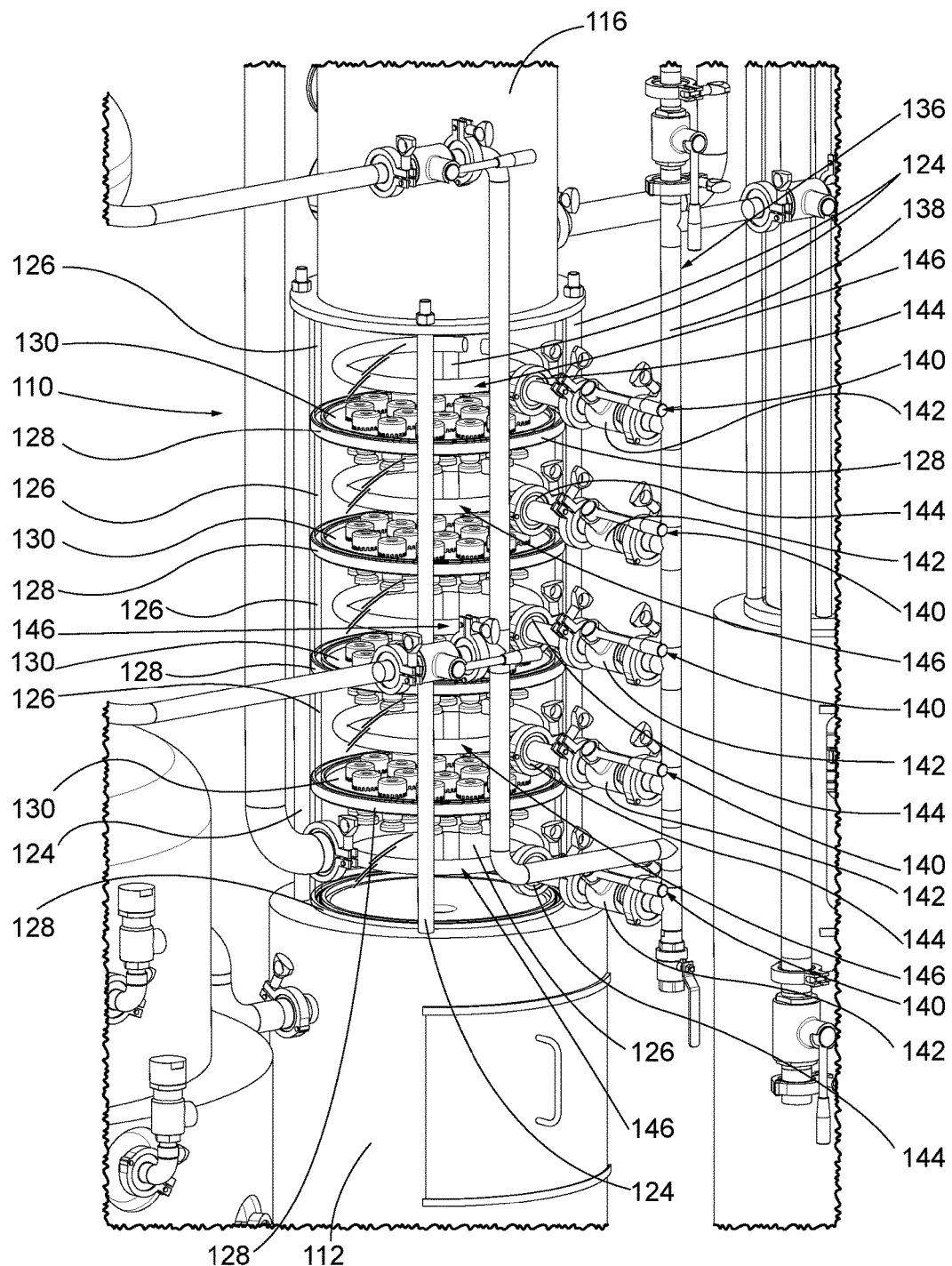
FIG. 2 is a perspective view of a portion of a rectification column for a distillation system, such as the distillation system shown in FIG. 1, according to an exemplary embodiment.
Figure 3:
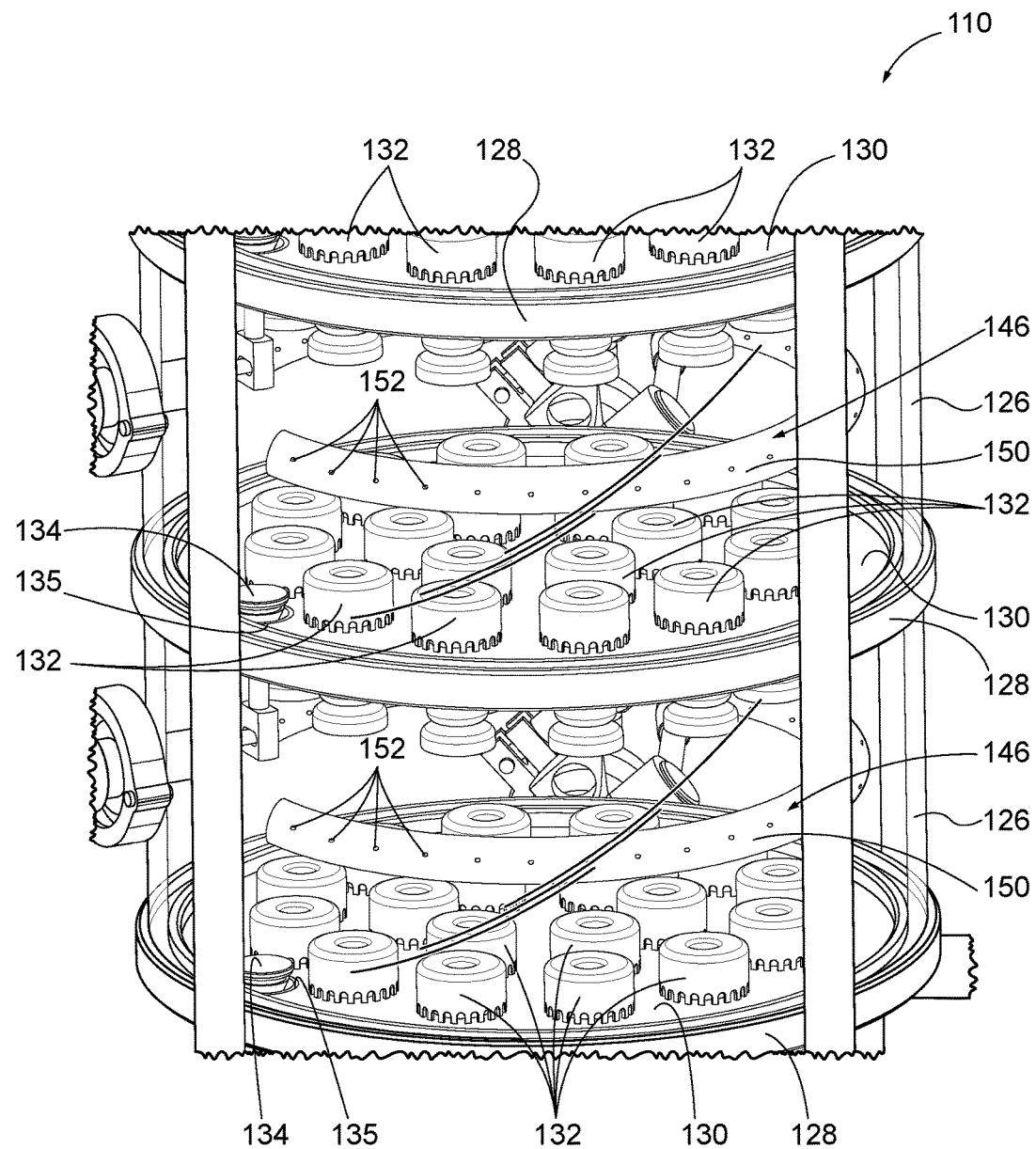
FIG. 3 is a detailed view of a portion of the rectification column shown in FIG. 2.

Referring now to FIGS. 2 and 3, the rectification column 110 is shown in greater detail. The rectification column 110 includes a plurality of support columns 124 that are coupled to the low wines receiver 112 and the dephlagemator 116. The rectification column 110 also includes a number column sections 126. The column sections 126 are preferably constructed from clear glass such that the interior of the rectification column 110 can be visually inspected by an operator. Each of the column sections 126 is held between two annular supports 128 such that a substantially liquid and vapor-tight seal is formed between the column section 126 and the annular supports 128. One of the annular supports 128 is coupled to the low wines receiver 112, and another of the annular supports 128 is coupled to the dephlagemator 116. The rectification column 110 also includes a plurality of plates 130, each of the plates 130 being coupled to the annular supports 128 that are positioned between the low wines receiver 112 and the dephlagemator 116. Each plate 130 is coupled to an annular support 128 such that a substantially liquid and vapor-tight seal is formed between the plate 130 and the annular support 128 and such that substantially no liquid or vapor may pass therebetween.

In operation, the vapor flows upwards from the low wines receiver 112 into a first section of the rectification column 110 below a first plate 130. The vapor flow through the rectification column 110 may be driven by a density differential between the vapor and surrounding air and/or by a pressure differential within the rectification column 110. The vapor then flows upwards through the first plate 130 and into a second section of the rectification column 110 between the first plate 130 and a second plate 130. This process continues for each of the plates 130 in the rectification column 110 until the vapor flows into the dephlagemator 116. Simultaneously, the reflux from the dephlagemator 116 flows into a first section of the rectification column 110 between the dephlagemator 116 and a first plate 130. The reflux and any other liquid in the first section then flow downward through the first plate 130 into a second section of the rectification column 110 between the first plate 130 and a second plate 130. This process continues for each of the plates 130 in the rectification column 110 until the liquid flows downward back into the low wines receiver 112.

The plates 130 divide the rectification column 110 into a plurality of sections between which individual equilibrium processes can occur. Each equilibrium process is defined by the vapor that is moving through the plate 130 and the liquid that is above the plate 130 reaching, or substantially reaching, equilibrium. The plates 130 are configured such that each of the plates 130 can be selectively bypassed so that less equilibrium processes occur. In this way, the distillation system 100 may be tailored for a target application by configuring the plates 130 such that a target number of the plates 130 are bypassed. By increasing the number of equilibrium processes that occur, and therefore decreasing the number of plates 130 that are bypassed, the concentration of the alcohol and/or ethanol in the product liquid produced by the distillation system 100 is also increased. For example, the rectification column 110 may include twelve plates 130, ten of which may be bypassed when the product liquid produced by the distillation system 100 is whiskey. The number of the plates 130 that are not bypassed by the vapor is equal to the number of equilibrium process that occur.

As shown in FIG. 3, the rectification column 110 includes a plurality of caps 132, such as bubble caps, with a plurality of the caps 132 being coupled to, and extending through, each of the plates 130. The caps 132 provide the fluid pathway to facilitate the transfer of the vapor upward through the plates 130 from one section to another while substantially preventing the transfer of the liquid through the caps 132. When liquid is present on the plate 130, the caps 132 cause the vapor below the plate 130 to pass through or bubble up through the liquid, thereby allowing the liquid and the vapor to approach equilibrium.

The liquid is selectively drained from the plate 130 via a conventional valve member 134 that extends through an aperture 135 on the plate. The valve member 134 is selectively opened and closed in order to drain the liquid from the plate 130. When the liquid is drained from the plate 130 via the aperture 135, a pressure drop occurs. In this way, the valve member 134 can be repositioned to regulate an equilibrium of the liquid and the vapor above and/or below the plate 130 through which the liquid is drained. Because each plate 130 includes a valve member and an aperture 135, the equilibrium of the liquid and vapor above and below each of the plates 130 within the rectification column 110 can be regulated.

In operation, the distillation system 100 produces a product liquid, such as whisky or bourbon. This operation may cause deposits (e.g., organic material, etc.) to form on surfaces within the rectification column 110 because of a chemical reaction between the surfaces within the rectification column 110 and the vapor and/or liquid passed through the rectification column 110. These deposits need to be periodically removed or cleaned and the rectification column 110 includes a fluid distribution system 136 that receives pressurized cleaning solution from a supply.

As seen in FIG. 2, the fluid distribution system 136 sprays the exposed surfaces inside the rectification column 110 with a pressurized cleaning solution (e.g., food grade cleaning solution, caustic and citric acid, etc.) to remove these deposits. For example, after the product liquid has been removed from the distillation system 100, the fluid distribution system 136 is adapted to clean the rectification column 110 in preparation for using the distillation system 100 to produce another batch of the product liquid. In this way, the fluid distribution system 136 provides a significant benefit to the rectification column 110 compared to conventional columns that must be disassembled to be manually cleaned. As a result, the fluid distribution system 136 provides a significant cost-saving mechanism for the rectification column 110 compared to conventional columns. Further, the fluid distribution system 136 utilizes less cleaning solution than conventional columns because the pressurized cleaning solution is precisely sprayed within the rectification column 110 and is not wasted as may occur when conventional columns are cleaned.

The rectification column 110 also provides other advantages compared to conventional columns because the column sections 126 are constructed from glass. In contrast, conventional columns typically have bodies that are constructed from copper resulting in significantly more deposits than those generated by the rectification column 110 because the column sections 126 are constructed from substantially inert glass and do not generate deposits. Further, the transparency of the column sections 126 gives an operator the ability to visually inspect various internal components of the rectification column 110 without taking the rectification column 110 apart. The operator may visually inspect the internal components of the rectification column 110 both during and after distillation and to ensure that the internal components are operating properly and to determine that the deposits have been adequately cleaned.

The fluid distribution system 136 routes the pressurized cleaning solution from a source (e.g., tank, etc.) to a common manifold 138 from which the pressurized cleaning solution is distributed to a plurality of branches 140. Each of the branches 140 includes a valve 142 and a flange 144. Each of the valves 142 can be repositioned by an operator independent of the other valves 142 to control the flow of the pressurized cleaning solution into the corresponding flange 144. The fluid distribution system 136 also includes a plurality of CIP rings 146 which each function to selectively provide the pressurized cleaning solution to individual column sections 126. Each of the flanges 144 is coupled to one of the CIP rings 146 and supports the CIP ring 146 via a corresponding column section 126. The CIP rings 146 are not constructed from copper but are instead constructed from another metallic material (e.g., aluminum, stainless steel, etc.). The CIP rings 146 are each located between two plates 130 and are each configured to (e.g., structured to, etc.) use the pressurized cleaning solution provided by the corresponding branch 140 to: (i) create agitation which cleans the column section 126 between the two plates 130, between a top plate 130 and the dephlagemator 116, and/or between a bottom plate 130 and the low wines receiver 112; (ii) create agitation which cleans the two plates 130; and/or (iii) create agitation which cleans the caps 132 on the two plates 130. In regards to the caps 132, the CIP rings 146 are positioned such that each of the CIP rings 146 encircles (e.g., encompasses, encloses, borders, etc.) the caps 132 on a plate 130 proximate thereto. In other words, the caps 132 are positioned along the plates 130 within a cylindrical space or internal area defined by each of the CIP rings 146.

The fluid distribution system 136 can provide focused cleaning at individual sections, and therefore individual components, of the rectification column 110 without spraying pressurized cleaning solution on other sections of the rectification column 110. This allows the fluid distribution system 136 to operate efficiently by cleaning only the sections of the rectification column 110 that require cleaning. By selectively opening and closing the valves 142, an operator can dictate which sections of the rectification column 110 will be cleaned by the fluid distribution system 136. Different sections of the fluid distribution system 136 may be cleaned depending on the product liquid that the distillation system 100 is producing. In contrast, conventional columns offer no ability to clean individual sections or to control cleaning of individual sections. Therefore, conventional distillation systems are less desirable than the distillation system 100 because conventional columns are more difficult to clean than the rectification column 110 and because conventional columns require a time intensive and inefficient cleaning process when compared to utilizing the focused fluid distribution system 136 to clean the rectification column 110.

Figure 4:
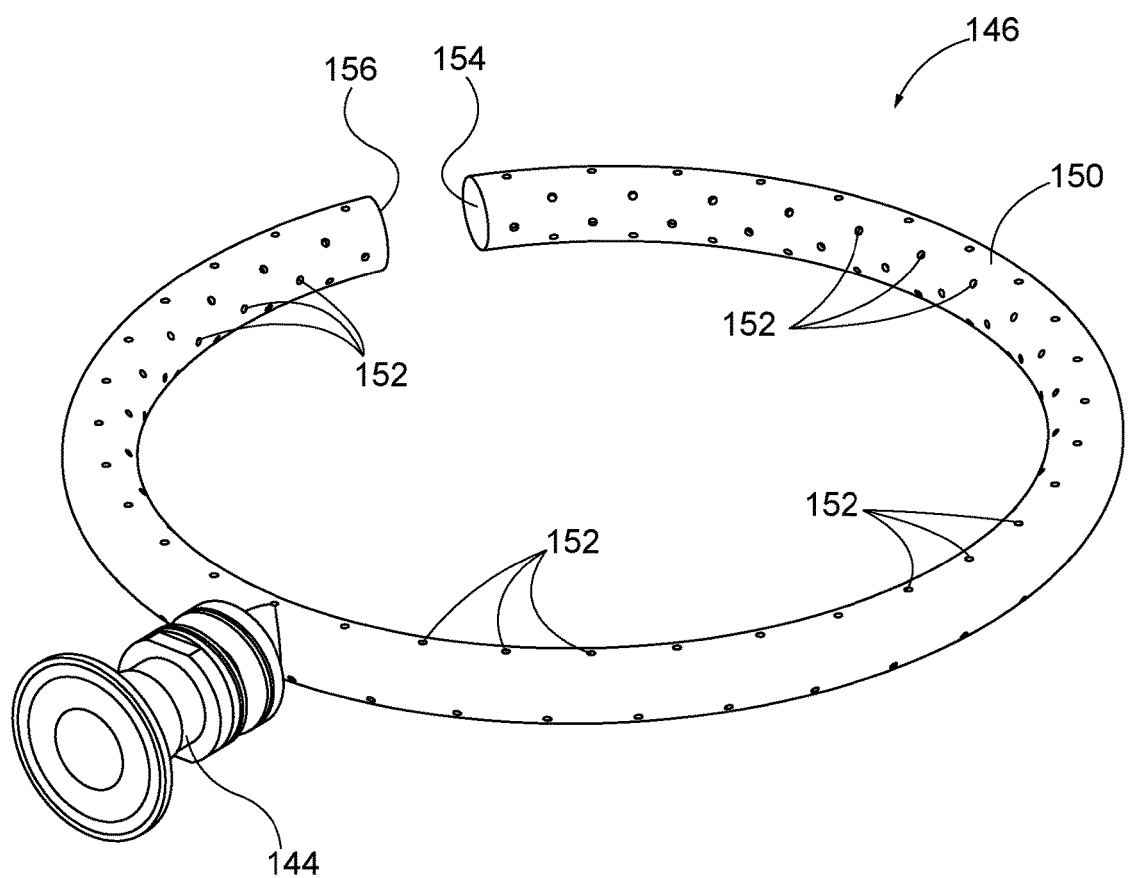
FIG. 4 is a perspective view of a clean-in-place ring for a rectification column, such as the rectification column shown in FIG. 2, according to an exemplary embodiment.
Figure 5:
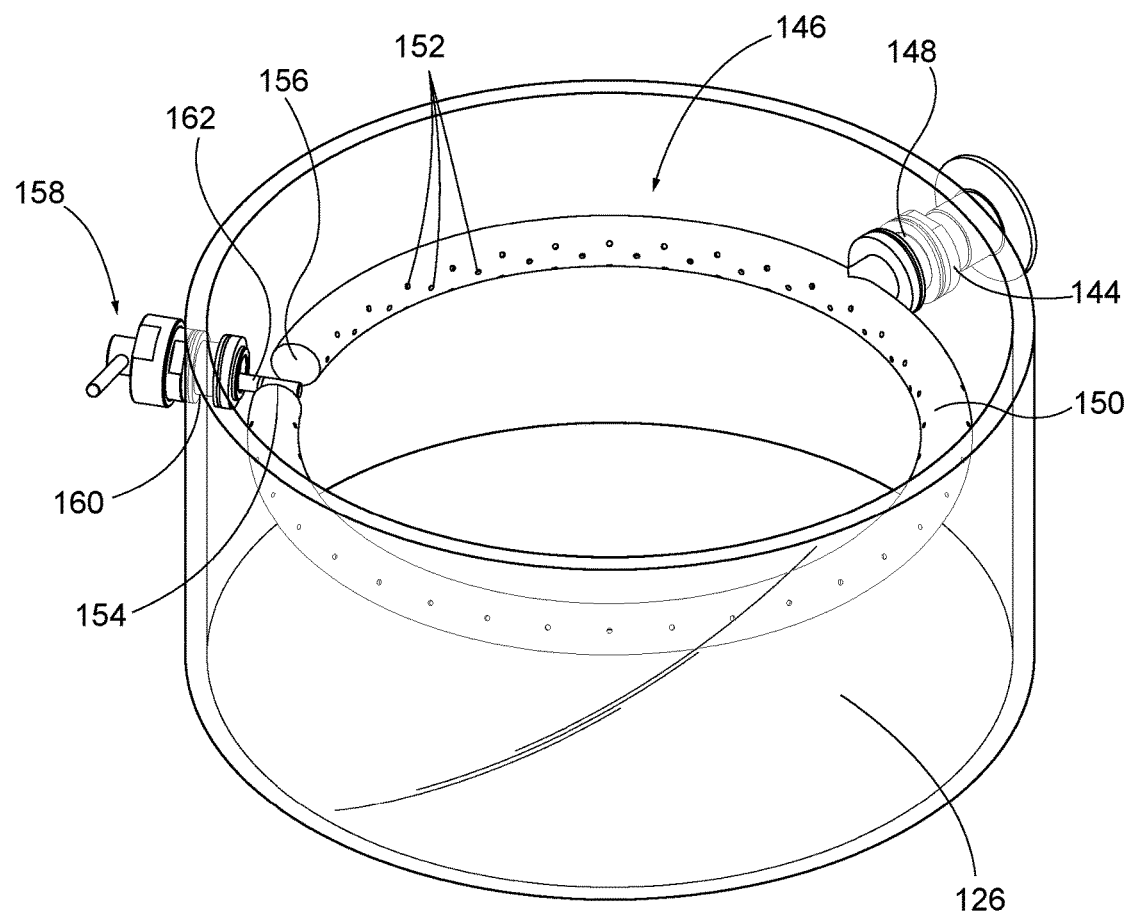
FIG. 5 is another perspective view of a clean-in-place ring for a rectification column, such as the rectification column shown in FIG. 2, according to an exemplary embodiment.

FIGS. 3-5 illustrate the CIP ring 146 in greater detail. As shown, the flange 144 couples the CIP ring 146 to a column section 126 through an aperture 148 in the column section 126. The flange 144 forms a liquid and vapor-tight seal between the column section 126 over the aperture 148. Each of the flanges 144 selectively receives the pressurized cleaning solution from the corresponding branch 140, as controlled by the corresponding valve 142, and provides the pressurized cleaning solution to a body 150 of the corresponding CIP ring 146 through the corresponding column section 126.

The pressurized cleaning solution flows into the body 150 from the flange 144 and begins to fill the body 150. The pressurized cleaning solution flows out of the body 150 through a plurality of apertures 152 disposed along the body 150. The apertures 152 each function as a nozzle (e.g., jet, etc.) to direct the pressurized cleaning solution to a desired location within the rectification column 110. Specifically, some of the apertures 152 direct the pressurized cleaning solution towards the caps 132 such that the copper surfaces of the caps 132 are regenerated after being sprayed with the pressurized cleaning solution. Further, some of the apertures 152 direct the pressurized cleaning solution towards the plates 130 such that the copper surfaces of the plates 130 are regenerated after being sprayed with the pressurized cleaning solution. The apertures 152 are uniformly disposed along the body 150 such that the pressurized cleaning solution is provided from the CIP ring 146 substantially three-hundred and sixty degrees about the central axis of the rectification column 110 and substantially three-hundred and sixty degrees about the central axis of the body 150 of the CIP ring 146. The apertures 152 are all the same shape, size, and configuration such that pressurized cleaning solution is provided with the same pressure and flow rate from all of the apertures 152. However, the location and orientation of the apertures 152 can be modified according to the particular needs of the system.

The body 150 is annular and discontinuous. Specifically, the body 150 is a semi-circular tube (e.g., pipe, conduit, etc.) that is defined by a first end 154 and a second end 156 abutting the first end 154. The first end 154 and the second end 156 define a relatively small gap in the CIP ring 146. None of the apertures 152 are disposed along the first end 154 or the second end 156.

The rectification column 110 includes a valve assembly 158 that extends through another aperture 160 in the column section 126. The valve assembly 158 forms a liquid and vapor-tight seal with the column section 126 over the aperture 160. The valve assembly 158 includes the valve member 134 and a stem 162 that extends into the gap between the first end 154 and the second end 156. The valve assembly 158 is rotated by an operator to cause rotation of the stem 162 within the gap between the first end 154 and the second end 156. Rotation of the stem 162 selectively translates the valve member 134 between an open and a closed position. In this way, the valve assembly 158 is utilized to control the position of the valve member 134 and therefore to regulate the equilibrium of the plate 130 into which the valve member 134 may extend.

Figure 6:
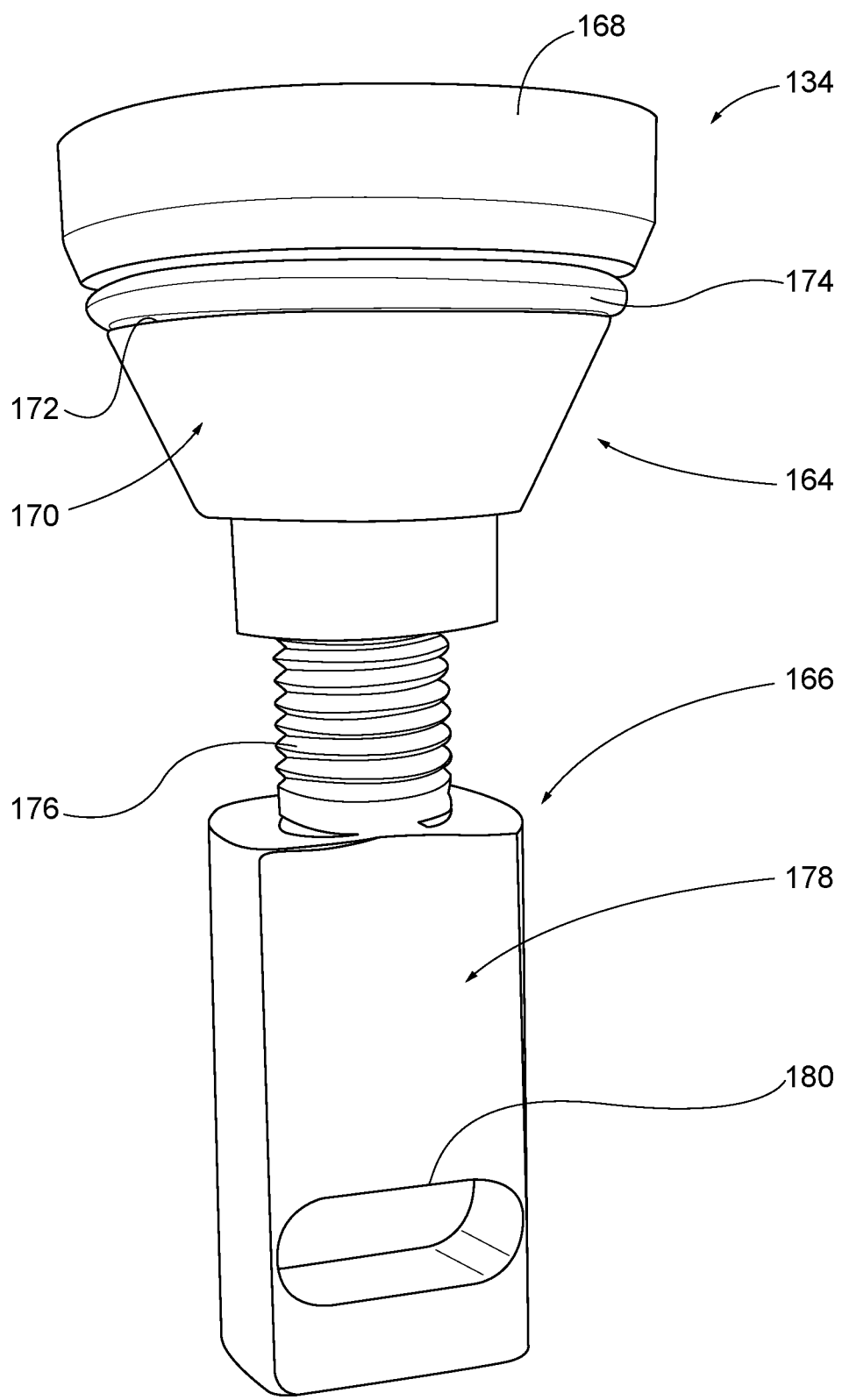
FIG. 6 is a perspective view of a valve member for a rectification column, such as the rectification column shown in FIG. 2, according to an exemplary embodiment.

FIG. 6 illustrates one embodiment of the valve member 134 in greater detail. The valve member 134 includes a sealing portion 164 and a connecting portion 166. The sealing portion 164 is preferably constructed from copper, and the connecting portion 166 is preferably not constructed from copper but is instead constructed from another metallic material (e.g., aluminum, stainless steel, etc.). When the pressurized cleaning solution is provided to the plate 130 proximate the sealing portion 164, the pressurized cleaning solution causes regeneration of the sealing portion 164.

The sealing portion 164 includes a cylindrical portion 168 and a frustoconical portion 170. The frustoconical portion 170 includes an annular recess 172 that receives a seal 174, such as an O-ring, about the frustoconical portion 170. The cylindrical portion 168 and the frustoconical portion 170 are sized to be received in the aperture 135. Contact between the frustoconical portion 170 and the aperture 135 selectively causes compression of the seal 174 within the annular recess 172 such that the valve member 134 is sealed within the aperture 135. To facilitate this sealing, the aperture 135 is sized to receive both the cylindrical portion 168 and the frustoconical portion 170.

The connecting portion 166 includes a threaded portion 176, a connector 178, and a slot 180 positioned within, and extending through, the connector 178. The threaded portion 176 threadably engages the frustoconical portion 170 of the sealing portion 164 such that the connecting portion 166 can be selectively repositioned relative to the sealing portion 164. In this way, the valve member 134 can be calibrated for a target application of the rectification column 110 and/or the distillation system 100, such as by being calibrated for a target thickness of a plate 130 or a target depth of an aperture 135.

The slot 180 is configured to receive the stem 162 such that the stem 162 slidably engages the slot 180. In operation, rotation of the valve assembly 158 causes the stem 162 to contact the slot 180 and causes corresponding movement of the valve member 134 within the aperture 135. In this way, the stem 162 and the valve member 134 may have a cam-style movement.

The column sections 126, the annular supports 128, and the plates 130 may have various shapes, sizes, and configurations such that the rectification column 110 and/or the distillation system 100 is tailored for a target application. For example, each column section 126 may have a diameter of 12.4 inches. In another example, each column section 126 has a diameter of 12.5 inches. Similarly, in one example each column section 126 has a length of 5.91 inches. In this example, the CIP rings 146 may be positioned less than 2.9 inches from a top end of the column section 126.

In various applications, the column sections 126 may be constructed from Plexiglas, acrylic, colored glass, tempered glass, tinted glass, frosted glass, or other similar transparent material. In some alternative applications, the column sections 126 are constructed from copper, aluminum, stainless steel, and other similar metallic materials. In these alternative applications, the fluid distribution system 136 may be differently configured to ensure effective and efficient cleaning of the column sections 126.

The column sections 126 and the annular supports 128 may be separated by various gaskets, seals (e.g., O-rings, etc.), and/or adhesives (e.g., silicone, chalk, sealant, etc.). For example, a first seal may be located between a first column section 126 and a first side of an annular support 128, and a second seal may be located between a second column section 126 and a second side of the annular support 128 opposite the first side of the annular support 128.

The annular supports 128 may be constructed from various materials and be of various shapes, sizes, and configurations such that the rectification column 110 and/or the distillation system 100 is tailored for a target application. In some embodiments, the annular supports 128 are constructed from food grade plastic. In other applications, the annular supports 128 are constructed from copper, aluminum, stainless steel, and other similar metallic materials.

The plates 130 may have various shapes, sizes, and configurations such that the rectification column 110 and/or the distillation system 100 is tailored for a target application. For example, some of the plates 130 may be larger and/or thicker than others of the plates 130. The annular supports 128 may be correspondingly configured. In various embodiments, the rectification column 110 is configured such that a distance between the low wines receiver 112 and a bottom plate 130, distances between the plates 130, and a distance between a top plate 130 and the dephlagemator 116 are all equal. In other embodiments, the rectification column 110 is configured such that at least one of a distance between the low wines receiver 112 and a bottom plate 130, distances between the plates 130, and a distance between a top plate 130 and the dephlagemator 116 is different from the others of the distance between the low wines receiver 112 and the bottom plate 130, the distances between the plates 130, and the distance between the top plate 130 and the dephlagemator 116. For example, the plates 130 may be closer together proximate to the low wines receiver 112 and further apart towards the dephlagemator 116, and vice versa.

The fluid distribution system 136 may receive the pressurized cleaning solution from various supplies and/or pumps. For example, the fluid distribution system 136 may receive concentrated cleaning solution from a first supply through a first valve and pressurized water from a second supply though a second valve. Following this example, the valves may be controlled so that the fluid distribution system 136 may be provided with any combination of pressurized water and concentrated cleaning solution. In some embodiments, the fluid distribution system 136 includes a drain valve that drains the pressurized cleaning fluid from the common manifold 138. In other embodiments, the common manifold 138 is coupled to other conduits, pipes, and tubes such that the fluid distribution system also provides the concentrated cleaning solution to other components of the distillation system 100.

The flange 144 contains a female thread and is configured to receive a male thread on a portion of the corresponding branch 140, downstream of the corresponding valve 142. In an exemplary embodiment, the flange 144 and the branch 140 are defined by a diameter of 1.5 inches. However, the branches 140, the valves 142, and the flanges 144 may be configured with various diameters such that the distillation system 100 and/or the rectification column 110 are tailored for a target application.

The CIP rings 146 may have various shapes, sizes, and configurations such that the rectification column 110 and/or the distillation system 100 is tailored for a target application. For example, in an embodiment where each column section 126 has a diameter of 12.4 inches, the body 150 of each CIP ring 146 may have a diameter of 9.84 inches when measured along the center line of the CIP ring 146 and about the central axis of the rectification column 110. The body 150 of each CIP ring 146 has a circular cross-section. In some embodiments, the body 150 of each CIP ring 146 has a circular cross-section with an outer diameter of 0.75 inches and an inner diameter of 0.63 inches, thereby defining a thickness of the body 150 of 0.12 inches. In other embodiments, the body 150 of the CIP ring 146 has a thickness of 0.6 inches. According to an exemplary embodiment, the bodies 150 are constructed from mandrel bent circular tubes. However, in other embodiments the bodies 150 are constructed from tubes having other cross-sectional shapes (e.g., square, hexagonal, etc.). Further, the CIP rings 146 may be constructed from copper or polymeric based material in some alternative applications.

The gap between the first end 154 and the second end 156 of each of the CIP rings 146 may be varied such that the CIP rings 146 are tailored for a target application. In various examples, the first end 154 and the second end 156 of each of the CIP rings 146 are separated by approximately ten degrees relative to the central axis of the rectification column 110. In some embodiments, the first end 154 and/or the second end 156 includes apertures that provide the pressurized cleaning solution into the rectification column 110 differently than the apertures 152. For example, the first end 154 and/or the second end 156 may include nozzles that are directed to target areas within the rectification column 110.

In some alternative embodiments, at least one of the CIP rings 146 does not include a gap and the body 150 is instead a continuous annular tube. In these embodiments, the valve assembly 158 is positioned between the CIP ring 146 and the plate 130 that is above the CIP ring 146. These embodiments may be advantageous because the CIP rings 146 may be easier and/or less expensive to manufacture without the gap. In other alternative embodiments, multiple of the CIP rings 146 are positioned between two of the plates 130, between a bottom plate 130 and the low wines receives 112, and/or between a top plate 130 and the dephlagemator 116. For example, the fluid distribution system 136 may include two of the CIP rings 146 between the top plate 130 and the dephlagemator 116. In still other alternative embodiments, the fluid distribution system 136 does not include the CIP ring 146 in various locations, such as between any of the plates 130, between the bottom plate 130 and the low wines receiver 112, and/or between the top plate 130 and the dephlagemator 116. In yet another alternative embodiment, the CIP rings 146 are built into, and integrated within, any of the low wines receiver 112, the dephlagemator 116, the column sections 126, and the plates 130.

The CIP rings 146 may not contain pressurized cleaning solution when the liquid and/or vapor from the distillation system 100 enters the rectification column 110. However, in some embodiments, the rectification column 110 includes a vacuum system, vacuum drying system, or another similar system to remove the pressurized cleaning solution within the rectification column prior to the liquid and/or vapor from the distillation system 100 entering the rectification column 110.

According to various embodiments, the CIP rings 146 are configured such that the apertures 152 each have a diameter of 0.787 inches (e.g., approximately two centimeters, etc.). Each of the CIP rings 146 may be configured to have the apertures 152 arranged into a plurality of annular rows. Some of these annular rows may be separated by ninety degrees relative to a center axis of the CIP ring 146. Further, the apertures 152 in each of these annular rows may be separated by ten degrees relative to the central axis of the rectification column 110. In some embodiments, some of the apertures 152 are have a different diameter compared to others of the apertures 152. The different diameters of the apertures 152 may be arranged according to the annular rows. For example, a top row of the apertures 152 may each have a larger diameter than a middle row of the apertures 152. Further, some or all of the apertures 152 may be various non-circular shapes, such as squares, rectangles, hexagons, polygons, stars, and other similar shapes. Depending on the configuration of each aperture 152, a different flow rate and/or pressure of the pressurized cleaning solution propelled through the aperture 152 may be achieved. The CIP rings 146 may be configured such that the apertures 152 have various shapes, sizes, and configurations, allowing the distillation system 100 and/or the rectification column 110 to be tailored for a target application.

According to an exemplary embodiment, the valves 142 and the valve assemblies 158 are mechanical valves that are controlled manually by an operator. In this way, neither the valves 142 nor the valve assemblies 158 utilize electricity. This construction is advantageous because it protects the distillation system 100 from unintended contact between electricity and conductive fluids, which could make the distillation system 100 less desirable. In an alternative embodiment, the valves 142 utilize hydraulic and/or electromechanical valves that are constructed such that any electricity is isolated and safely insulated relative to any conductive surfaces and/or fluids. For example, any electrical equipment can be sealed with waterproof sealing and other similar coverings.

In some embodiments, the rectification column 110 is sold to a consumer as a retrofit application. In these embodiments, the consumer may install the rectification column 110 on an existing distillation system in place of an existing column. Further, in other embodiments, the fluid distribution system 136 may be sold to a consumer as a retrofit application. In these embodiments, the consumer may install the fluid distribution system 136 within an existing column.

According to various embodiments, the distillation system 100 is configured such that the CIP rings 146 are provided at other locations within the distillation system 100. For example, the fluid distribution system 136 may include a CIP ring 146 positioned within the pot 102, the helmet 106, and/or the Lyne arm 108. Further, the distillation system 100 may include various CIP balls and other devices that are coupled to the fluid distribution system 136 and positioned within components of the distillation system 100 other than the rectification column 110, such as within the pot 102.

In some alternative applications, the connecting portion 166 of the valve member 134 is constructed from copper or polymeric based material. Similarly, in some alternative applications, the sealing portion 164 of the valve member 134 is constructed from polymeric based material or some other metallic material (e.g., aluminum, stainless steel, etc.).

While the fluid distribution system 136 has been shown and described with reference to the product liquid being an ethyl alcohol, it is understood that the fluid distribution system 136 may be utilized in other similar distillation applications, such as the distillation of various chemicals (e.g., the creation of unreacted starting materials, etc.), the production of fuels, desalination, and other similar applications. Similarly, while the fluid distribution system 136 has been shown and described with reference to the cleaning solution, it is understood that other liquids may instead be routed through the fluid distribution system 136, such as additives, reactants, and other similar liquids.

The embodiments described herein have been described with reference to the Figures. The Figures illustrate certain details of specific embodiments that implement the systems, methods, and programs described herein. However, describing the embodiments with Figures should not be construed as imposing on the disclosure any limitations that may be present in the Figures.

Although the Figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary," as used herein to describe various embodiments, is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the Figures. It should be noted that the orientation of various elements may differ according to other exemplary embodiments and that such variations are intended to be encompassed by the present disclosure.

The present invention is not limited to the particular methodology, protocols, and expression of design elements, etc., described herein and as such may vary. The terminology used herein is for the purpose of describing particular embodiments only and is not intended to limit the scope of the present invention.

As used herein, the singular forms include the plural reference and vice versa unless the context clearly indicates otherwise. The term "or" is inclusive unless modified, for example by "either." For brevity and clarity, a particular quantity of an item may be described or shown while the actual quantity of the item may differ. Other than in the operating examples, or where otherwise indicated, all numbers and reference characters expressing measurements used herein should be understood as modified in all instances by the term "about," allowing for ranges accepted in the art.

Unless defined otherwise, all technical terms used herein have the same meaning as those commonly understood to one of ordinary skill in the art to which this invention pertains. Although any known methods, devices, and materials may be used in the practice or testing of the invention, the methods, devices, and materials in this regard are described herein.

It should be understood that no claim element herein is to be construed under the provisions of 35 U.S.C. § 112(f), unless the element is expressly recited using the phrase "means for."

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in deposit to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure.

What is claimed is:

1. A distillation system comprising:
    a pot that selectively produces vapor; and
    a rectification column that receives the vapor from the pot, the rectification column comprising:
        a first plate positioned within the rectification column and defined by a center point;
        a first fluid distribution member positioned within the rectification column, the first fluid distribution member comprising a first plurality of apertures; and
        a fluid distribution system that receives a pressurized cleaning fluid and provides the pressurized cleaning fluid to the first fluid distribution member such that the pressurized cleaning fluid is propelled from the first fluid distribution member via the first plurality of apertures into the rectification column;

wherein at least some of the first plurality of apertures are configured to cause the pressurized cleaning fluid propelled therefrom to contact the first plate proximate at least one of the center point and points adjacent to the center point.

2. The distillation system of claim 1, wherein the rectification column further comprises:
a first column section comprising a first end and a second end;
a second column section comprising a first end and a second end; and
a first annular support positioned between the first column section and the second column section, the first annular support coupled to the first end of the first column section and the first end of the second column section;
wherein the first plate is coupled to the first annular support.

3. The distillation system of claim 2, wherein the rectification column further comprises:
a third column section comprising a first end and a second end;
a second annular support positioned between the second column section and the third column section, the second annular support coupled to the second end of the second column section and the first end of the third column section; and
a second plate positioned within the rectification column;
wherein the second plate is coupled to the second annular support; and
wherein the first fluid distribution member is positioned between the first plate and the second plate.

4. The distillation system of claim 3, wherein the rectification column further comprises a second fluid distribution member positioned within the rectification column, the second fluid distribution member comprising a second plurality of apertures;
wherein the second fluid distribution member is not positioned between the first plate and the second plate.

5. The distillation system of claim 4, wherein the fluid distribution system provides the pressurized cleaning fluid to the second fluid distribution member such that the pressurized cleaning fluid is propelled from the second fluid distribution member via the second plurality of apertures into the rectification column; and
wherein at least some of the second plurality of apertures are configured to cause the pressurized cleaning fluid propelled therefrom to contact one of the first plate and the second plate.

6. The distillation system of claim 5, wherein the rectification column further comprises:
a manifold that is positioned external to the rectification column, the manifold receiving the pressurized cleaning fluid;
a first branch that receives the pressurized cleaning fluid from the manifold, the first branch selectively providing the pressurized cleaning fluid to the first fluid distribution member; and
a first valve positioned along the first branch, the first valve controlling a flow of the pressurized cleaning fluid from the manifold to the first fluid distribution member.

7. The distillation system of claim 6, wherein the rectification column further comprises:
a second branch that receives the pressurized cleaning fluid from the manifold separate from the first branch, the second branch selectively providing the pressurized cleaning fluid to the second fluid distribution member; and
a second valve positioned along the second branch, the second valve controlling a flow of the pressurized cleaning fluid from the manifold to the second fluid distribution member independent of the first valve.

8. The distillation system of claim 2, wherein the first fluid distribution member comprises a first end and a second end and the first fluid distribution member defines a gap between the first end and the second end.

9. The distillation system of claim 8, wherein the rectification column further comprises a valve assembly that is coupled to the first column section, the valve assembly comprising:
a stem that protrudes into the rectification column; and
a valve member that is selectively repositioned between an open position and a closed position through an interaction with the stem;
wherein the first plate includes an aperture;
wherein the valve member is selectively repositioned within the aperture; and
wherein the aperture in the first plate facilitates a flow of liquid therethrough when the valve member is not in the closed position.

10. The distillation system of claim 9, wherein the first fluid distribution member is positioned between the first plate and the second end of the first column section; and
wherein valve assembly extends at least partially into the gap between the first end and the second end of the first fluid distribution member.

11. A rectification column for a distillation system, the rectification column comprising:
a first column section;
a second column section;
a first annular support supporting one of the first column section and the second column section and being supported by the other of the first column section and the second column section, the first annular support coupled to the first column section and the second column section;
a first plate coupled to the first annular support; and
a first fluid distribution member comprising a first plurality of apertures, the first fluid distribution member positioned within one of the first column section and the second column section, the first fluid distribution member selectively receiving fluid and providing the fluid through the first plurality of apertures.

12. The rectification column of claim 11, further comprising:
a third column section;
a second annular support positioned between the second column section and the third column section, the second annular support coupled to the second column section and the third column section;
a second plate coupled to the second annular support; and
a second fluid distribution member comprising a second plurality of apertures, the second fluid distribution member selectively receiving the fluid, separate from the first fluid distribution member, and providing the fluid, separate from the first fluid distribution member, through the second plurality of apertures;
wherein the second fluid distribution member is positioned within the third column section.

13. The rectification column of claim 11, further comprising a plurality of caps positioned within the first plate, the plurality of caps extending above the first plate and below the first plate;
    wherein the first fluid distribution member encircles the plurality of caps.

14. The rectification column of claim 13, further comprising a second fluid distribution member comprising a second plurality of apertures, the second fluid distribution member selectively receiving the fluid, separate from the first fluid distribution member, and providing the fluid, separate from the first fluid distribution member, through the second plurality of apertures;
    wherein the first fluid distribution member is positioned within the first column section; and
    wherein the second fluid distribution member is positioned within the second column section and encircles the plurality of caps.

15. The rectification column of claim 11, wherein the first column section and the second column section are constructed from glass.

16. A fluid distribution system for a distillation system, the fluid distribution system comprising:
    a first flange that selectively receives a fluid; and
    a first ring coupled to the first flange, the first ring positioned within the distillation system, the first ring comprising:
        a first annular body having a circular cross-section, the first annular body receiving the fluid from the first flange; and
        a first plurality of apertures disposed along the first annular body, each of the first plurality of apertures structured to provide the fluid from the first annular body to a first target within the distillation system;
    wherein at least one of the first targets is located inward from the first ring.

17. The fluid distribution system of claim 16, wherein the first ring further comprises a first end and a second end;
    wherein the first ring defines a gap between the first end and the second end.

18. The fluid distribution system of claim 16, wherein the first ring is defined by a central axis; and
    wherein the first plurality of apertures are uniformly distributed along the first annular body such that the fluid is provided by the first plurality of apertures in three-hundred and sixty degrees relative to the central axis.

19. The fluid distribution system of claim 16, further comprising:
    a manifold that receives the fluid;
    a first branch that receives the fluid from the manifold, the first branch selectively providing the fluid to the first ring; and
    a first manually controlled valve positioned along the first branch, the first manually controlled valve controlling a flow of the fluid from the manifold to the first ring.

20. The fluid distribution system of claim 19, further comprising:
    a second flange that selectively receives the fluid separate from the first flange; and
    a second ring coupled to the second flange, the second ring positioned within the distillation system, the second ring comprising:
        a second annular body receiving the fluid from the second flange separate from the first flange; and
        a second plurality of apertures disposed along the second annular body, each of the second plurality of apertures structured to provide the fluid from the second annular body to a second target within the distillation system;
    a second branch that receives the fluid from the manifold separate from the first branch, the second branch selectively providing the fluid to the second ring; and
    a second manually controlled valve positioned along the second branch, the second manually controlled valve controlling a flow of the fluid from the manifold to the second ring separate from the flow of the fluid from the manifold to the first ring.

\* \* \* \* \*